United States Patent
Byrd et al.

(10) Patent No.: US 8,147,592 B2
(45) Date of Patent: Apr. 3, 2012

(54) USING A METALLOCENE TO REMOVE OXYGEN FROM A STREAM OF GAS

(75) Inventors: Norman Robert Byrd, Villa Park, CA (US); Charles A. Smith, Fountain Valley, CA (US)

(73) Assignee: The Boeing Company, Chicago, IL (US)

( * ) Notice: Subject to any disclaimer, the term of this patent is extended or adjusted under 35 U.S.C. 154(b) by 833 days.

(21) Appl. No.: 12/049,135

(22) Filed: Mar. 14, 2008

(65) Prior Publication Data

US 2009/0230248 A1    Sep. 17, 2009

(51) Int. Cl.
   *B01D 53/02* (2006.01)

(52) U.S. Cl. .............. 95/138; 96/130; 96/143; 96/154; 244/135 A

(58) Field of Classification Search ............. 95/138; 526/943
See application file for complete search history.

(56) References Cited

U.S. PATENT DOCUMENTS

| | | | |
|---|---|---|---|
| 5,810,895 A * | 9/1998 | Staehle et al. ............ | 55/282 |
| 5,853,457 A * | 12/1998 | Eysmondt et al. ......... | 95/138 |
| 6,391,407 B1 * | 5/2002 | Kashiba et al. ............ | 428/35.7 |
| 6,491,740 B1 * | 12/2002 | Wang et al. ............... | 95/90 |
| 7,007,893 B2 | 3/2006 | Loss et al. | |
| 7,037,360 B2 * | 5/2006 | Inagaki et al. ............ | 96/126 |
| 7,152,635 B2 | 12/2006 | Moravec et al. | |
| 7,191,983 B2 | 3/2007 | Loss et al. | |
| 7,204,868 B2 | 4/2007 | Snow, Jr. | |
| 2002/0001686 A1 * | 1/2002 | Kashiba et al. ........... | 428/35.7 |
| 2002/0025273 A1 * | 2/2002 | Bushman et al. .......... | 422/24 |
| 2002/0078828 A1 * | 6/2002 | Kishkovich et al. ....... | 96/108 |
| 2002/0086929 A1 * | 7/2002 | Chiang et al. ............. | 524/417 |
| 2003/0180519 A1 * | 9/2003 | Kashiba et al. ........... | 428/304.4 |
| 2004/0157017 A1 * | 8/2004 | Mauze et al. ............. | 428/35.7 |
| 2006/0211811 A1 * | 9/2006 | Goto et al. ................ | 524/502 |
| 2007/0068389 A1 * | 3/2007 | Yaghi ....................... | 96/148 |
| 2008/0227912 A1 * | 9/2008 | Ohta et al. ................ | 524/601 |

* cited by examiner

*Primary Examiner* — Duane Smith
*Assistant Examiner* — Christopher P Jones

(57) ABSTRACT

A filter includes a metallocene for removing oxygen from a gas stream. The filter further includes a support for the metallocene.

14 Claims, 6 Drawing Sheets

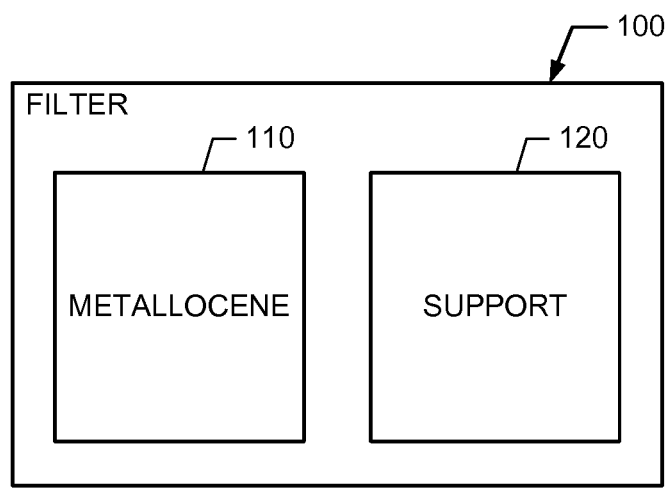
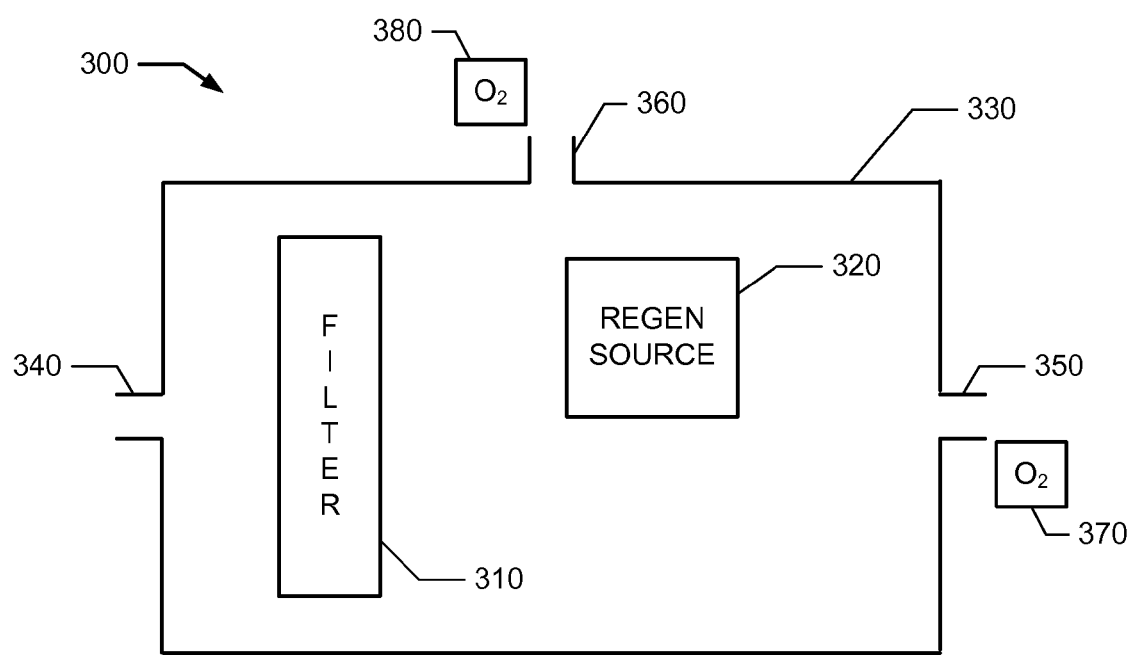

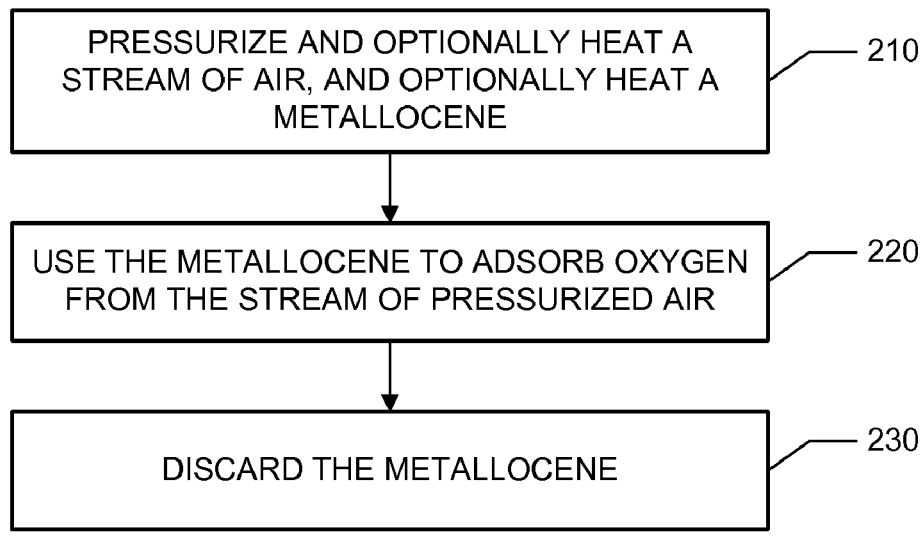
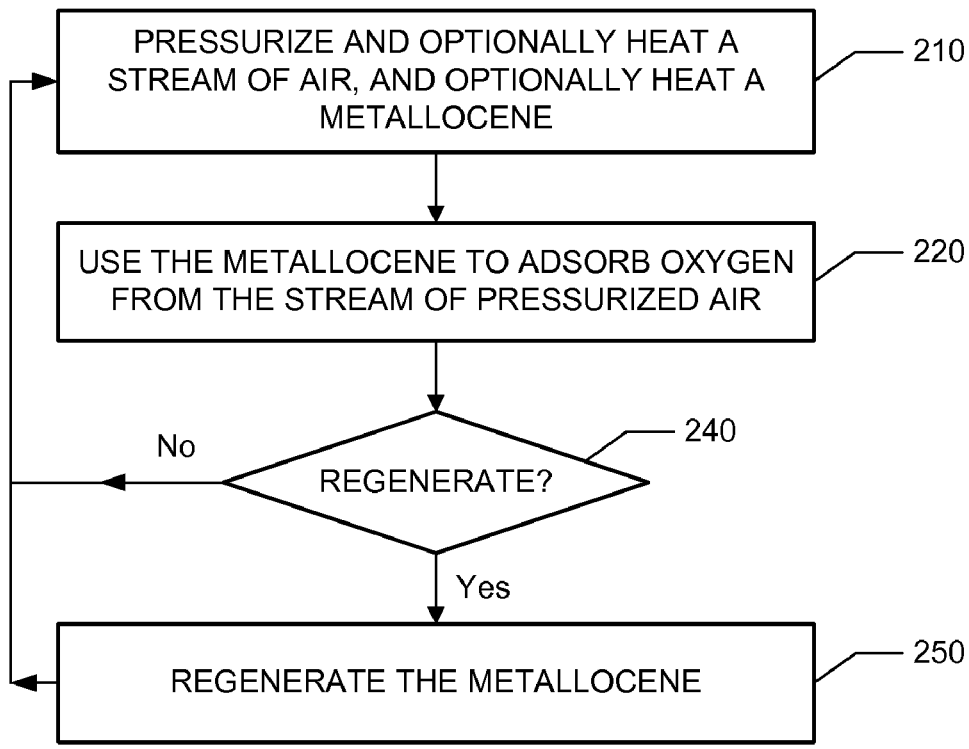

USING A METALLOCENE TO REMOVE OXYGEN FROM A STREAM OF GAS

BACKGROUND

A metallocene may be described as an LM, where L is a substituted or unsubstituted cyclopentadienyl, indenyl or fluorenyl moiety, and M is from the group of transition metals Group IVB, (e.g., titanium, zirconium, hafnium), Group VB (e.g., vanadium, niobium, tantalum), Group VIIIB (e.g., iron, cobalt, nickel, ruthenium), and the lanthanide series (e.g., lanthanum). In all metallocenes, the various metallic species interact with a cyclopentadienyl moiety, which is either part of a larger organic structure (e.g., indenyl or fluorenyl) or with a simple cyclopentadienyl moiety (e.g., $C_5H_5$).

Metallocenes are used as catalysts for the polymerization of olefins. The resulting polymers have controlled tacticity, narrow molecular weight distribution and well-characterized molecular structure. Other uses for metallocenes include the manufacture of acetic acid, a fuel additive for antiknock, an antitumor agent in the medical field, and a fire retardant.

SUMMARY

According to an embodiment of the present invention, a filter includes a metallocene for removing oxygen from a gas stream. The filter further includes a support for the metallocene.

According to another embodiment, an aircraft fuel inerting system includes a filter. The filter includes a metallocene for removing oxygen from a stream of pressurized air. An outlet of the filter provides a stream of nitrogen-enriched air to a fuel tank.

According to another embodiment, an aircraft includes a fuel tank, a source for supplying a stream of pressurized air, and an oxygen filtering system. The filtering system includes a metallocene for filtering the air stream to produce a stream of nitrogen-enriched air. The nitrogen-enriched air is supplied to the fuel tank.

BRIEF DESCRIPTION OF THE DRAWINGS

FIG. 1 is an illustration of a filter in accordance with an embodiment of the present invention.

FIGS. 2a and 2b are illustrations of filtering methods in accordance with embodiments of the present invention.

FIG. 3 is an illustration of a filtering system in accordance with an embodiment of the present invention.

DETAILED DESCRIPTION

Figure 4:
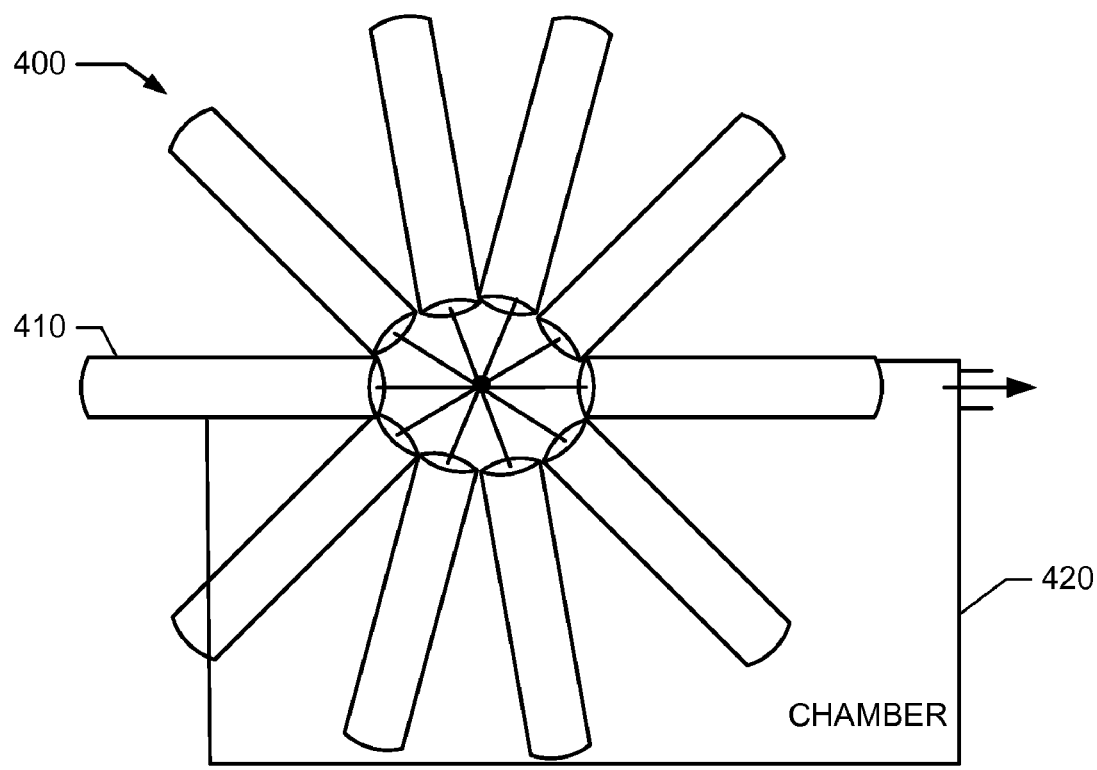
FIG. 4 is an illustration of a system for providing continuous filtering in accordance with an embodiment of the present invention.

Reference is made to FIG. 1, which illustrates a filter 100 for removing oxygen from a gas stream. The filter 100 includes a metallocene 110 and a support 120 for the metallocene 110. When a gas stream containing oxygen flows through or over the support 120, the metallocene 110 adsorbs the oxygen and, consequently, reduces the concentration of oxygen in the gas stream.

The metallocene 110 is not limited to any particular type. The metallocene 110 may be homogeneous (e.g., dicyclopentadienyl, diindenyl or difluorenyl), or heterogeneous (e.g., cyclopentadienyl-indenylcyclopentadienyl-fluorenyl with a metallic atom sandwiched between). Examples of metallocenes include, without limitation, ferrocenes, zirconocenes, hafnocenes, ruthenocenes, and titanocenes (e.g., fluorenyl zirconium compounds such as the dicyclopentadienyl-difluorenyl zirconium, dicyclopentadienyl titanium dichloride, dicyclopentadienyl zirconium dichloride or dicyclopentadienyl titanium dichloride), among others (e.g., bis (ethylcyclopentadienyl) chromium, bis(ethylcyclopentadienyl) manganese, tris (tetramethylcyclopentadienyl)-erbium, and bis(ethylcyclopentadienyl) nickel). The chemical reactivity of all these metallocenes involves the interaction of delocalized electrons of the cyclopentadienyl moiety with the metal atom. All of the metallocenes should behave similarly and perform equally as well as oxygen scavengers. These examples are representative of the large class of metallocenes available.

In some embodiments, the support 120 is solid. An example of a solid support is a bed of nodules coated with metallocene 110. During filtering, the gas stream flows over the solid support.

In some embodiments, the support 120 is porous. Examples of a porous support include, but are not limited to, porous silica, metal mesh (e.g., stainless steel wire mesh), a carbon-based (e.g., graphite) fiber cloth, glass cloth, glass wool, silicon carbide foam, etc. During filtering, the gas stream flows through the porous support. Thickness of the porous support determines the tortuosity path for the gas stream to pass through. This, in part, determines the efficiency of oxygen removal.

The metallocene 110 may be coated onto the support 120 from a solution. The support 120 (porous or solid) may be soaked in a solution of the metallocene (dissolved in methyl alcohol) or the solution can be sprayed onto the support (all under argon atmosphere), dried under argon and inserted into a housing (e.g., a canister or hollow tube) and kept sealed under argon until ready for use.

Reference is made to FIG. 2a, which illustrates a method of using the filter 100 to remove oxygen from a stream of air. At block 210, the stream of air is pressurized. For example, the air may be pressurized between 15 psia and 60 psia. At block 210, the air may optionally be heated. The metallocene 110 may also be heated. Although most metallocenes are stable to at least, 500° C., the temperature range for removal of oxygen may be from a low temperature (e.g., −40° C.) to an elevated temperature (e.g., around 120° C.) but preferably between 25° C. and 60° C.

At block 220, the pressurized air is flowed through or over the support 120. The metallocene 110 adsorbs oxygen in the air. The air leaving the filter 100 has lower concentration of oxygen, and a higher concentration of nitrogen.

In some embodiments, the metallocene 110 is single-use. At block 230, once the metallocene 110 has fully adsorbed oxygen, it is discarded.

In other embodiments, the metallocene 110 is not discarded. Instead, the metallocene 110 is regenerated.

Reference is made to FIG. 2b, which illustrates another method of using the metallocene 110. At block 210, a stream of air is pressurized and optionally heated. The metallocene 110 may also be heated. At block 220, the pressurized air is flowed through or over the support 120.

At block 240, a decision is made as to whether the metallocene 110 should be regenerated. As a first example, this decision is made by sensing amount of oxygen in the stream exiting the filter 100. A sudden increase in the amount of oxygen would suggest that it is time to regenerate the metallocene 110. As a second example, the decision is made by sensing the concentration of oxygen in the stream exiting the filter 100, and comparing the concentration to a threshold. A concentration below the threshold would suggest that it is time to regenerate the metallocene 110. As a third example, the regeneration is performed after a fixed amount of time.

At block 250, the oxygen-adsorbed metallocene 110 is regenerated. During regeneration, oxygen is desorbed from the metallocene 110. The metallocene may be regenerated by exposing the metallocene 110 to light (ultraviolet or visible), or heating the metallocene to a high temperature (above 200° C.), or both. Heating may be performed with infrared heaters or with heating elements in a regenerating chamber. Applying both heat and light can increase the rate of desorption. Some embodiments might use light alone, while other embodiments might use heat alone. Still other embodiments might use a combination of heat and light. Once the metallocene 110 has been regenerated, additional filtering may be performed (block 210).

Reference is made to FIG. 3, which illustrates a regenerative filtering system 300. The system 300 includes a filter 310 having a support that is coated with a metallocene. The system 300 further includes a source 320 for regenerating the metallocene. The source 320 can provide heat, or light (ultraviolet light, or visible light, or both) or both heat and light. This source 320 will cause oxygen to be desorbed from the metallocene.

The system 300 further includes a chamber 330 for containing the filter 310 and the light source 320. The chamber 330 has an inlet 340 for admitting a gas stream containing oxygen, a first outlet 350 for allowing the filtered stream to exit the chamber 330, and a second outlet 360 for allowing desorbed oxygen to exit the chamber 330.

The system 300 may perform filtering as follows. During filtering, a stream of pressurized gas is admitted into the chamber 330 via the inlet 340, where it passes through or over the filter 310 and exits the chamber 330 via the first outlet 350. Oxygen in the gas stream is adsorbed by the metallocene. Consequently, the gas stream exiting the chamber 330 has a lower oxygen concentration than the gas stream entering the chamber 330. During filtering, the second outlet 360 may be closed.

A first oxygen concentration sensor 370 is located at the first outlet 350. The first oxygen concentration sensor 370 indicates when the metallocene should be regenerated (e.g., when the oxygen level reaches a certain percentage).

The system 300 may regenerate the metallocene as follows. The inlet 340 and first outlet 350 are closed, and the regenerative source 320 is turned on, whereby oxygen is desorbed from the metallocene. The desorbed oxygen may be pumped out of the chamber 330 via the second outlet 360. A second oxygen concentration sensor 380 at the second outlet 360 may be used to sense the amount of oxygen that has been desorbed. The second oxygen concentration sensor 380 indicates when the regenerative source 320 can be turned off (e.g., when no more oxygen is coming off the filter 310). Once the metallocene has been regenerated, additional filtering may be performed.

The filtering performed by the system 300 of FIG. 3 is not continuous. However, it can be used in a system that performs continuous filtering. Systems for performing continuous filtering will now be described.

Reference is made to FIG. 4, which illustrates a system 400 for providing continuous filtering, even as the metallocene is being regenerated. The system 400 includes a set of filters 410, with each filter 410 including metallocene and a support for the metallocene. A filter 410 is rotated into a position where it can be used to filter oxygen. In such a position, an inlet of the filter 410 is in position to receive a stream of compressed gas, and an outlet of the filter 410 is in position to provide a stream of nitrogen-enriched gas.

When a filter 410 becomes saturated with oxygen, the set of filters 410 is rotated. The rotation places a regenerated filter 410 in a position where it can be used to filter oxygen. The rotation also places an oxygen-saturated filter 410 into a chamber 420 where it is regenerated (e.g., heated to about 200° C.). The oxygen that is desorbed may be pulled out and vented to the outside.

FIG. 4 shows five filters 410 being regenerated simultaneously, and five filers 410 being used to filter oxygen. However, the system 410 is not so limited. The filters 410 may be used one at a time to adsorb oxygen, or several may be used simultaneously. Similarly, the filters 410 may be regenerated one at a time, or several may be regenerated simultaneously.

The system 400 is not limited to ten filters 410. Other numbers of filters 410 may be used.

Figure 5:
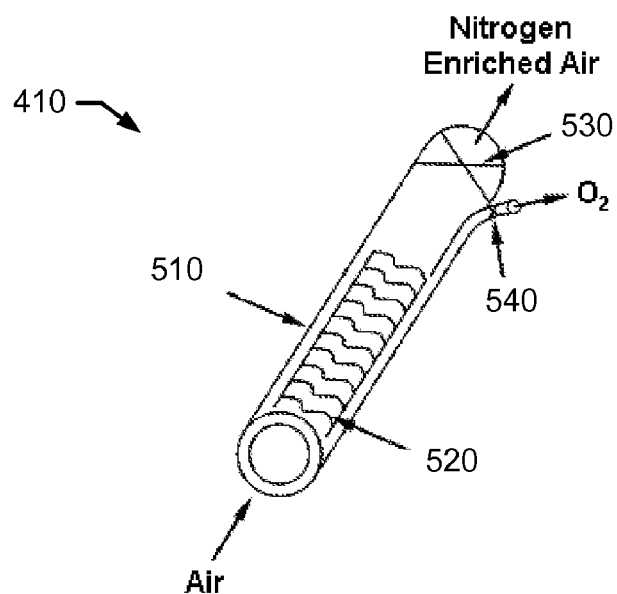
FIG. 5 is an illustration of a filter in accordance with an embodiment of the present invention.

Reference is made to FIG. 5, which illustrates an example of a filter 410 for the system 400 of FIG. 4. The filter 410 includes a cylinder 510 that may be made of polyetherimide (PEI), polyimide (PI), polyetheretherketone (PEEK) or a composite of PEI/Graphite, PI/graphite, or PEEK/graphite. A cylinder 510 made of a clear plastic may allow regeneration via heat and light. A cylinder 510 made of a composite allows regeneration via heat only.

The support 520 may include glass cloth or graphite (carbon) cloth impregnated with a metallocene. Or, the support 520 may include particulates of glass powder, glass wool, glass beads, metal powder or foamed silicon carbide that is coated with a metallocene. For example, the support 520 may be slurried in a metallocene solution (under argon) and packed into the cylinder 510 and sealed under argon.

The support 520 may be removable from the cylinder 510. A cylinder 510 may be removed if damage or contamination occurred, or if the metallocene needed replacement.

Pressurized air flows into one end of the cylinder, 510 and nitrogen enriched air flows out of an opposite end of the cylinder 510. A first shut-off valve 530 is open during filtering to allow nitrogen-enriched air to flow out of the cylinder 510. The first valve 530 is off during regeneration.

A second shutoff valve 540 is open during regeneration to allow desorbed oxygen to leave the cylinder 510. The second shutoff valve 540 is closed during oxygen filtering.

The filter 410 of FIG. 5 may be used in systems other than the system 400 of FIG. 4.

Figure 6:
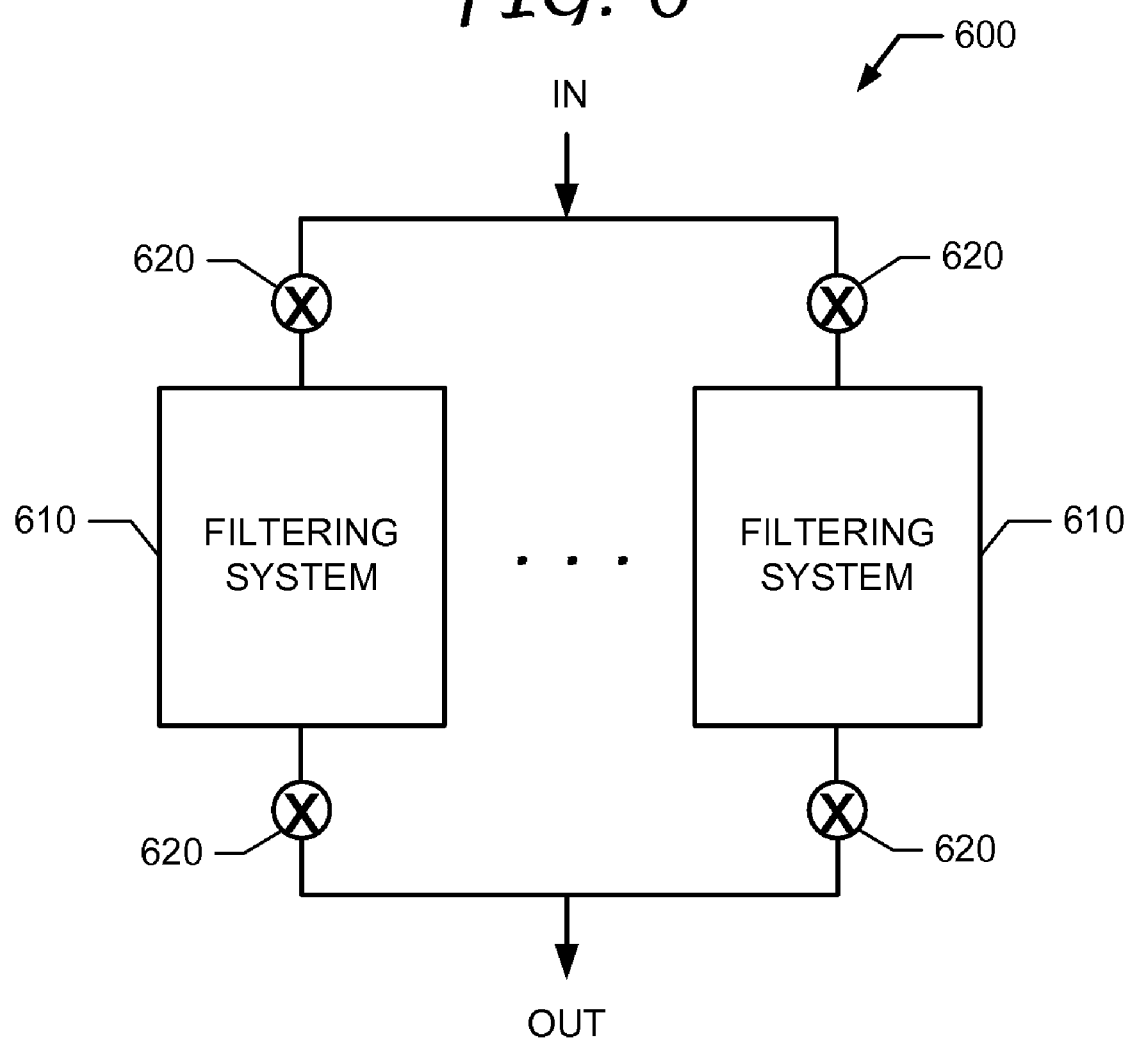
FIG. 6 is an illustration of another system for providing continuous filtering in accordance with an embodiment of the present invention.

Reference is made to FIG. 6, which illustrates another system 600 for providing continuous filtering, even as metallocene is being regenerated. The system 600 includes a plurality of filtering systems 610. As one filtering system 610 is performing filtering, another filtering system 610 is having its metallocene regenerated. Inlet and outlet streams can be directed to and from the appropriate filtering systems 610 by valves 620.

Figure 7:
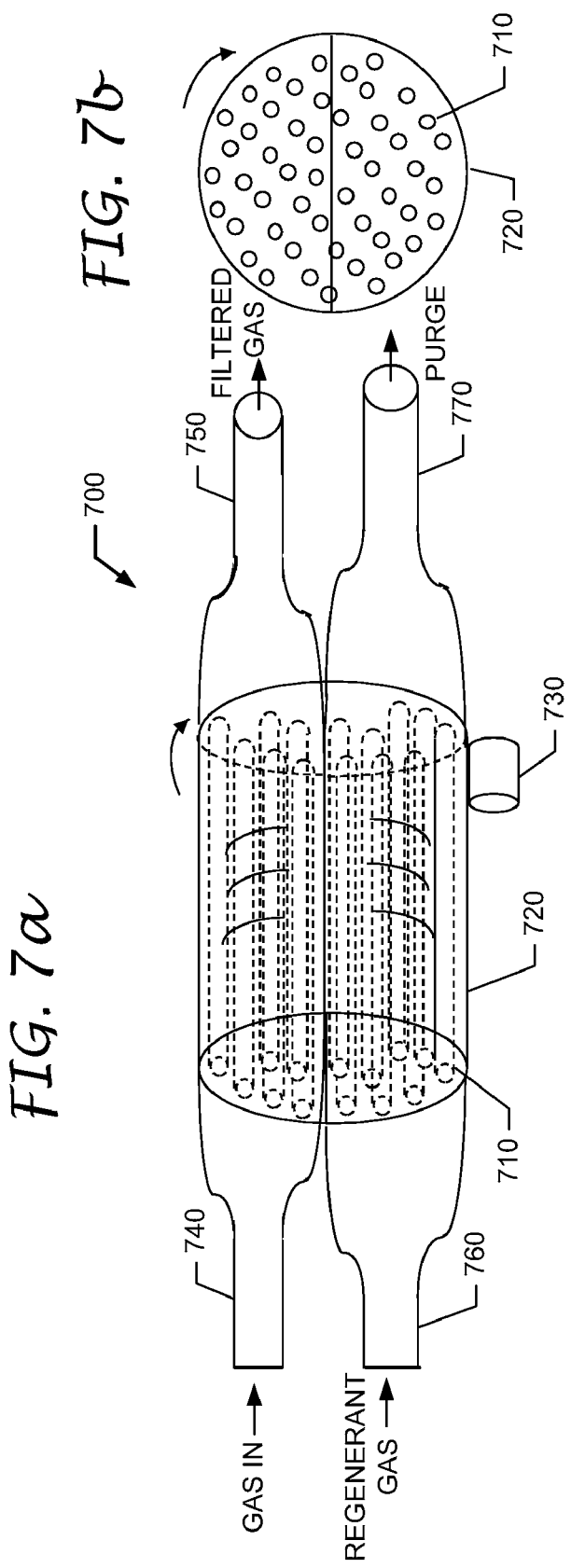
FIGS. 7a and 7b are illustrations of another system for providing continuous filtering in accordance with an embodiment of the present invention.

Reference is made to FIGS. 7a and 7b, which illustrate yet another system 700 for providing continuous filtering, even as metallocene is being regenerated. The system 700 includes a plurality of filters 710 including a metallocene, and a rotatable filter holder 720 for the filters 710. The filters 710 may be in a circular arrangement. The filter holder 720 may be rotated by a motor 730. The system 700 further includes first and second plenums 740 and 750 that form a pathway for gas filtering, and third and fourth plenums 760 and 770 that form a pathway for metallocene regeneration. The plenums 740-770 are stationary, and the filter holder 720 is rotated relative to the plenums 740-770.

At all times, either the gas to be treated or a regenerant gas flow through the filters 710. The regenerant gas heats the oxygen-adsorbed metallocene to desorb oxygen. The rotation speed of the filter holder 720 may be adjusted to the time taken to exhaust the oxygen removal time of the filters 710, and the time required to regenerate them.

Filtering described herein is not limited to any particular system. However, one particular system is a fuel inerting system for an aircraft. Fuel inerting is performed to reduce the presence of oxygen in the tank and, therefore, reduce fuel flammability.

Figure 8:
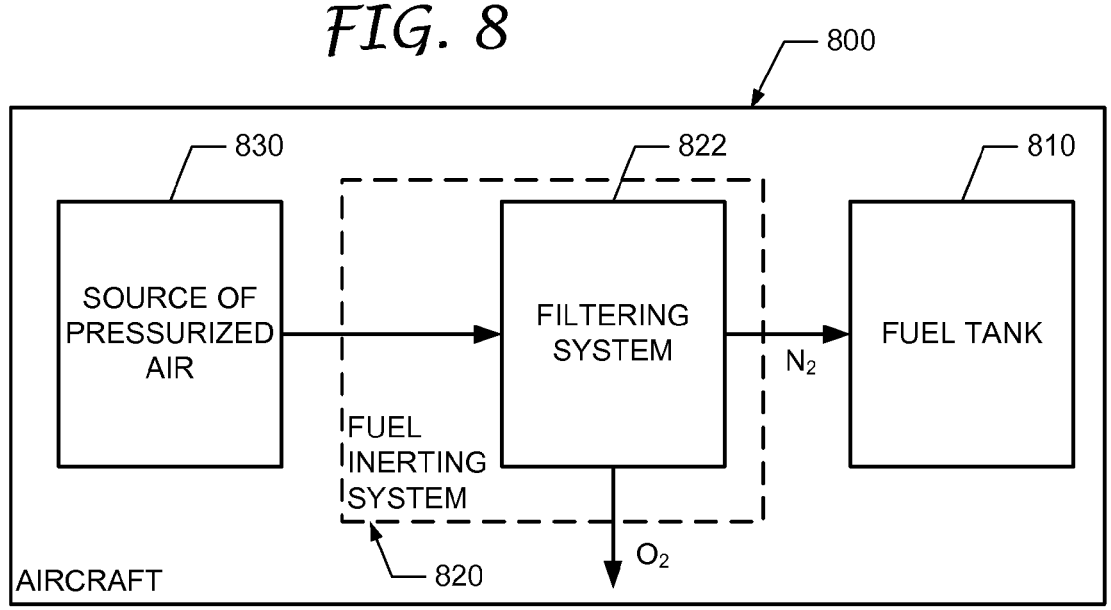
FIG. 8 is an illustration of a fuel inerting system in accordance with an embodiment of the present invention.

Reference is made to FIG. 8. An aircraft 800 includes a fuel tank 810 and a fuel inerting system 820. The fuel inerting 820 system includes a regenerative filtering system 822 for removing oxygen from a pressurized stream of air. The filtering system 822 provides a stream of nitrogen-enriched air (NEA) to an inlet of the fuel tank 810. Oxygen that was desorbed during regeneration can be vented overboard.

Any removal of oxygen in the air will reduce the possibility of combustion in the fuel tank 810. When the concentration of oxygen is lowered to about nine percent, the chance of combustion becomes negligible.

The fuel inerting system 820 need not supply a continuous stream of NEA to the fuel tank 810. During takeoff and cruise, only enough NEA is needed to replace the fuel burned. However, during descent, when the fuel tank 810 is mostly empty, enough NEA should be added to pressurize the fuel tank 810 from the cruise altitude pressure to the pressure at landing. This could require a very high flow of NEA if the fuel tank 810 is nearly empty and the descent is rapid. The fuel inerting system 820 may include pressure gauges for comparing the pressure in the tank to the outside pressure.

In some embodiments, a single fuel inerting system 820 will handle multiple fuel tanks. In other embodiments, a single fuel inerting system 820 will handle one tank 810.

The pressurized air may be supplied to the filtering system 822 by a source 830 that is on board the aircraft. In some embodiments, one such source 830 of pressurized air is the aircraft's cabin. Pressurized air from the aircraft cabin may be supplied to the filtering system 822.

In other embodiments the source 830 of pressurized air may be a turbine engine of the aircraft 800. Bleed air from a turbine engine may be cooled in a heat exchanger to about 40° C. to 60° C., and the cooled air may be supplied to the filtering system 822. In contrast, the cabin pressure air doesn't need to be cooled since it is already at room temperature.

Filtering described herein is not limited to any particular application. The filtering is not limited to reducing the concentration of oxygen in air. The filtering could be used to reduce the concentration of oxygen in other gases.

A system according to an embodiment of the present invention may use the desorbed oxygen in addition to, or instead of, gas having a reduced oxygen concentration. For example, a system according to an embodiment of the present invention may include a regenerative filter that filters a stream of pressurized gas, and produces a stream of filtered gas and a stream of oxygen. The filtered gas is discarded, and the stream of oxygen is used.

Figure 9:
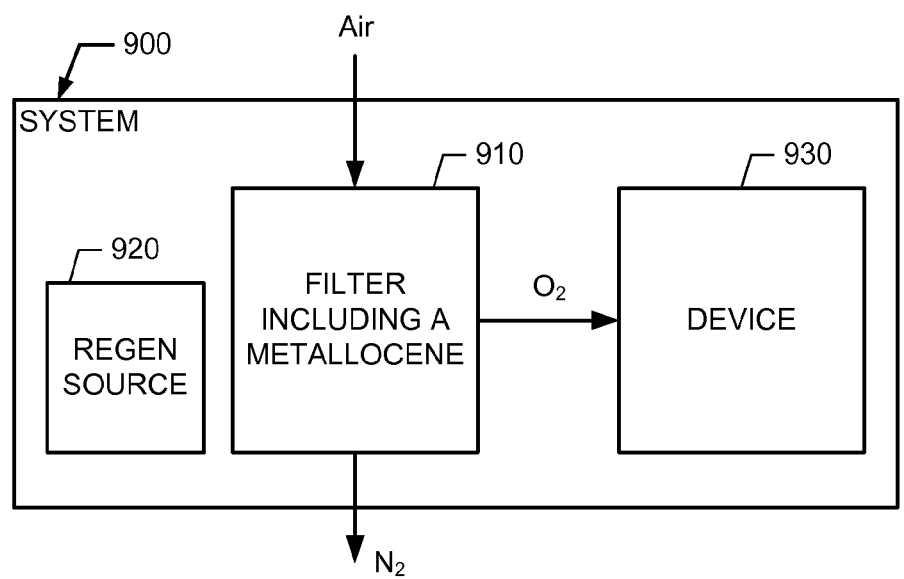
FIG. 9 is an illustration of a system in accordance with an embodiment of the present invention.

Reference is now made to FIG. 9, which illustrates a system 900 including a filter 910 including metallocene for adsorbing oxygen from a stream of gas, a source 920 for desorbing oxygen from the metallocene, and a device 930 for using the desorbed oxygen.

As but one example, the system 900 may be used to supply a stream of oxygen-enriched air to patients whose lungs have difficulty extracting sufficient oxygen from air (e.g., patients who suffer from emphysema). In some embodiments, the filter 910 may contain the example shown in FIG. 5, but sized to be a portable device, through which air is passed and filtered. When oxygen is desorbed, it is passed into a breathing apparatus for use by patients requiring oxygen-enriched air. The system 900 would be lighter, less cumbersome and more mobile than a conventional system (e.g., a cylinder containing compressed air).

The invention claimed is:

1. A system comprising a fuel tank, a source of pressurized air, and a fuel inerting system including metallocene for removing oxygen from the pressurized air to produce nitrogen-enriched air, the fuel inerting system supplying the nitrogen-enriched air to an inlet of the fuel tank.

2. The system of claim 1, wherein the metallocene is coated on a support.

3. The system of claim 1, further comprising a source for regenerating the metallocene.

4. The filter of claim 3, wherein the source provides at least one of ultraviolet and visible light for regenerating the metallocene.

5. The filter of claim 3, wherein the source provides heat for regenerating the metallocene.

6. The system of claim 1, further comprising a source for regenerating the metallocene; and a housing for the metallocene and the regenerative source, the housing having an inlet for admitting the pressurized air, a first outlet for the stream after it has been filtered by the metallocene, and a second outlet for oxygen that has been desorbed from the metallocene.

7. The system of claim 1, wherein the metallocene is contained in a plurality of filters; the system further comprising a regeneration chamber for simultaneously regenerating several of the filters.

8. The system of claim 7, further comprising means for rotating the plurality of filters such that oxygen-saturated filters are moved into the regeneration chamber.

9. The system of claim 1, further comprising means for desorbing oxygen from the metallocene; and a device for using the desorbed oxygen.

10. A method of using the system of claim 1, comprising pressurizing a stream of air, and flowing the pressurized air over the metallocene.

11. The method of claim 10, further comprising heating the air to a temperature between 25° C. and 60° C. prior to flowing the pressurized air over the metallocene.

12. The method of claim 10, further comprising heating the metallocene to promote oxygen adsorption.

13. The method of claim 10, further comprising regenerating the metallocene.

14. The method of claim 13, wherein during regeneration, the metallocene is heated to desorb adsorbed oxygen into a separate gas stream; and wherein the temperature of oxygen adsorption is lower than the temperature of desorption during regeneration.

* * * * *